(12) United States Patent
Wood

(10) Patent No.: US 7,497,578 B2
(45) Date of Patent: Mar. 3, 2009

(54) MONITORING SCAN MIRROR MOTION IN ELECTRO-OPTICAL READERS AND IMAGE PROJECTORS

(75) Inventor: Frederick F. Wood, Medford, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 709 days.

(21) Appl. No.: 11/116,642

(22) Filed: Apr. 28, 2005

(65) Prior Publication Data

US 2006/0244924 A1    Nov. 2, 2006

(51) Int. Cl.
*G03B 21/00* (2006.01)
*G03B 29/00* (2006.01)
*G02B 26/08* (2006.01)
*H01F 5/00* (2006.01)
*H04N 3/02* (2006.01)

(52) U.S. Cl. .................. 353/43; 353/46; 353/121; 359/201; 335/299; 348/771; 348/98; 348/195; 356/513

(58) Field of Classification Search .............. 353/46, 353/43, 30, 121; 359/201; 335/136, 149, 335/213, 299; 336/110; 348/771, 98, 195; 356/513; 396/117; 235/462.36; 372/38.02
See application file for complete search history.

(56) References Cited

U.S. PATENT DOCUMENTS

2006/0065735 A1* 3/2006 Li et al. .................. 235/462.36
2006/0187423 A1* 8/2006 Hamilton et al. .............. 353/79

* cited by examiner

*Primary Examiner*—Diane I Lee
*Assistant Examiner*—Magda Cruz
(74) *Attorney, Agent, or Firm*—Kirschstein, et al.

(57) ABSTRACT

Crosstalk between a drive coil and a primary feedback coil is eliminated by positioning a secondary feedback coil in proximity with the drive coil for contamination by the crosstalk to the same extent as the primary feedback coil, and by processing feedback signals generated by the feedback coils to cancel the crosstalk. The drive coil is used to oscillate a scan mirror employed in an image projection arrangement or an electro-optical reader.

10 Claims, 9 Drawing Sheets

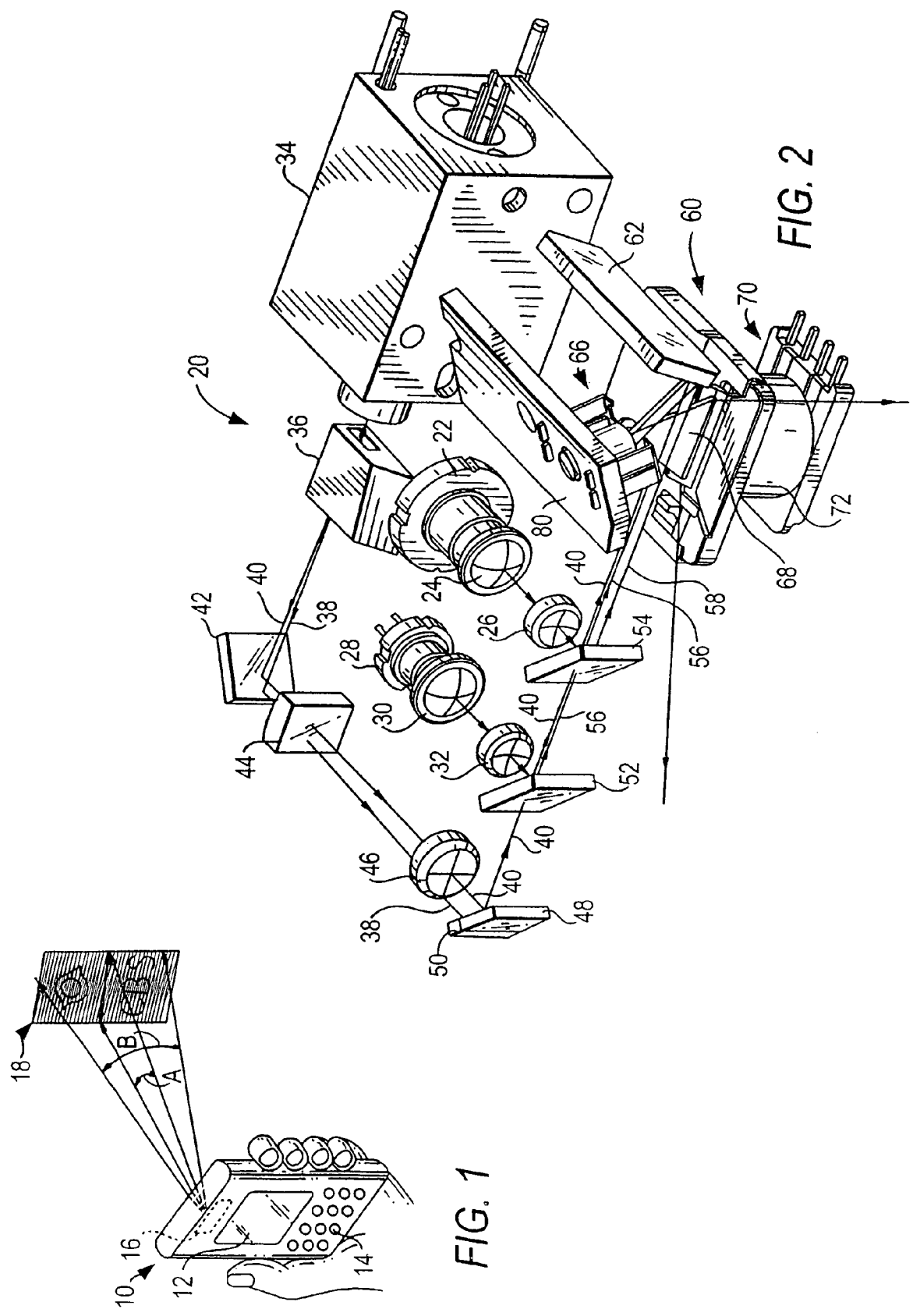

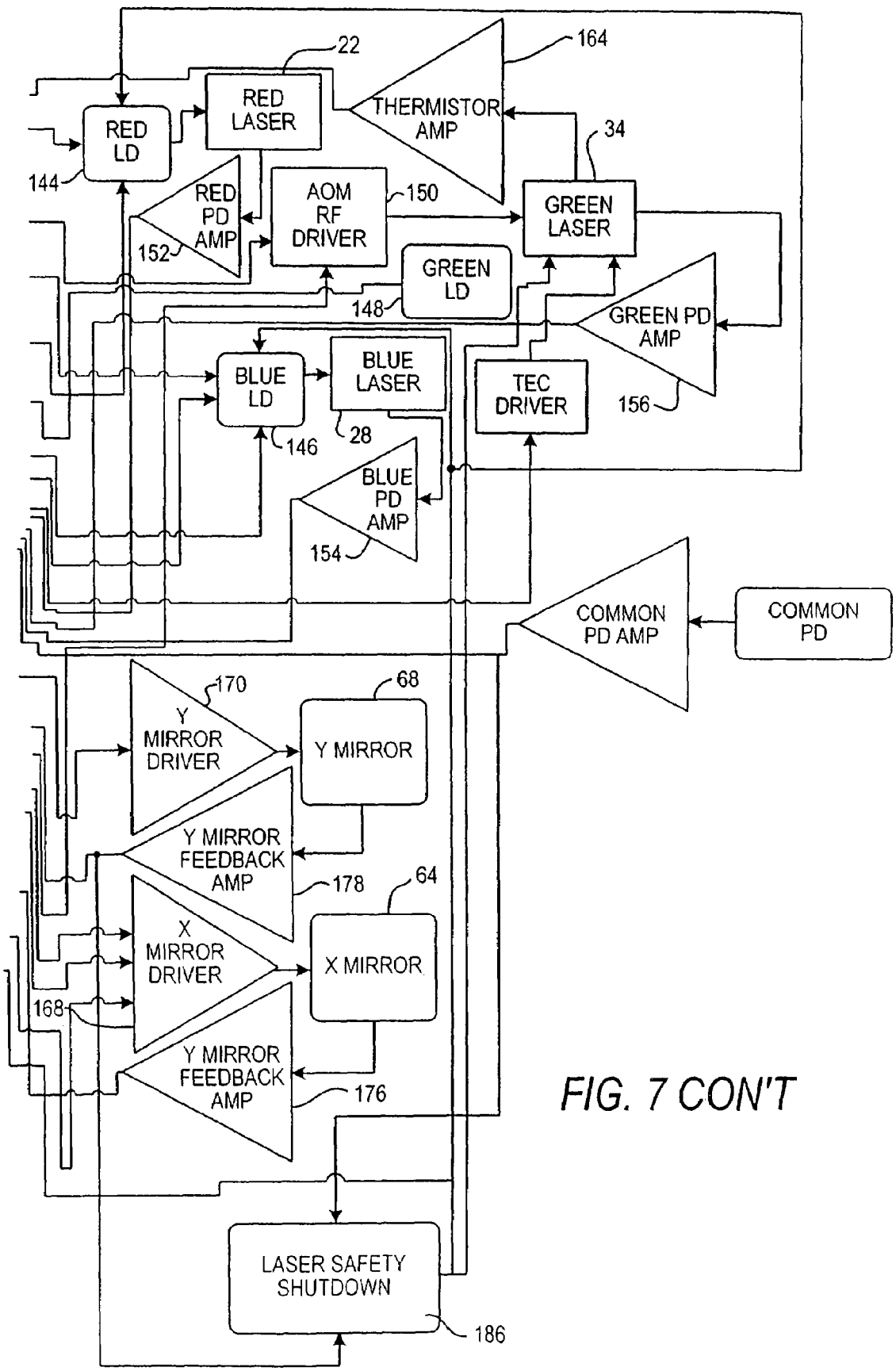
FIG. 7 CON'T

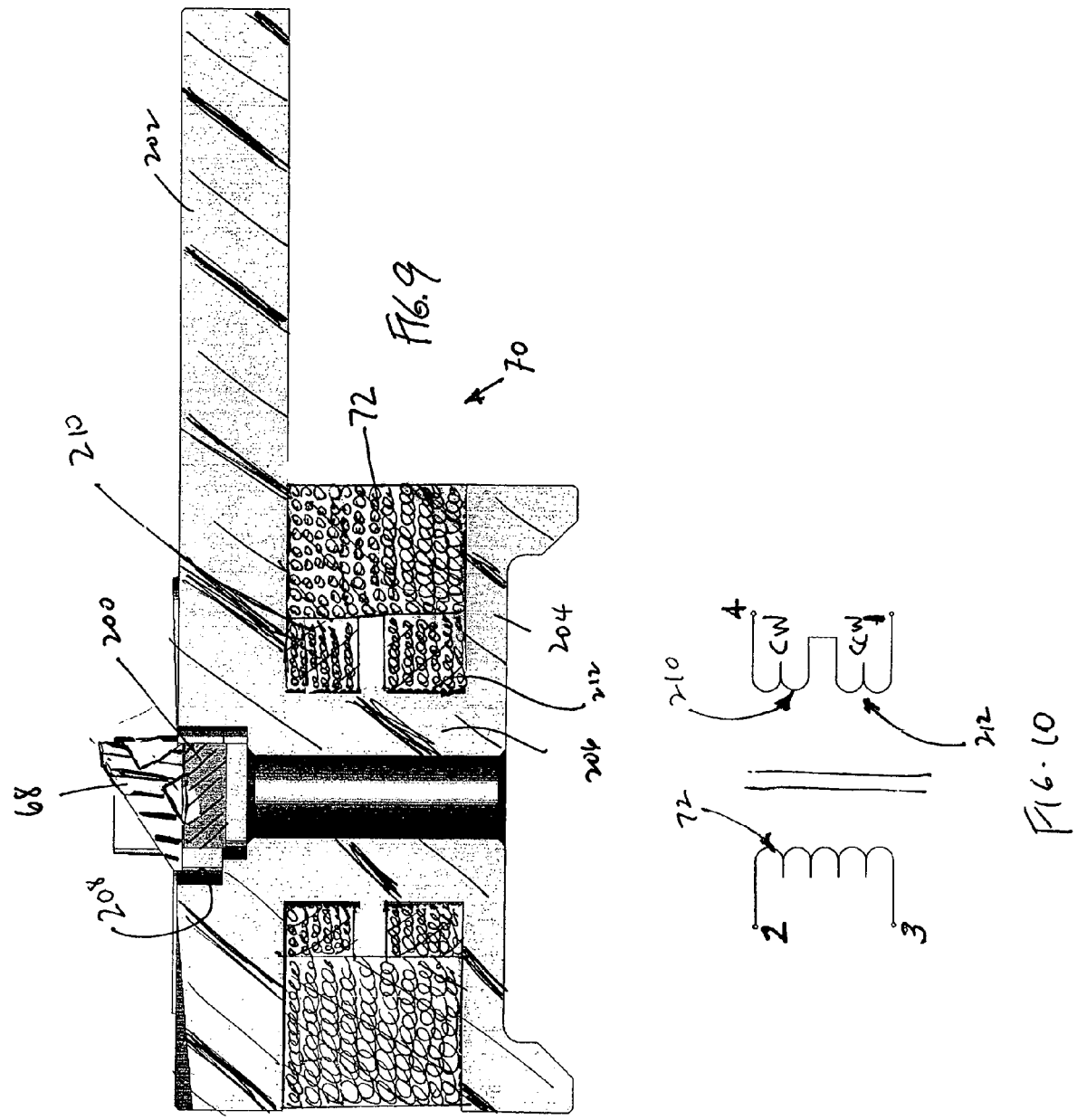

MONITORING SCAN MIRROR MOTION IN ELECTRO-OPTICAL READERS AND IMAGE PROJECTORS

BACKGROUND OF THE INVENTION

1. Field of the Invention

The present invention generally relates to monitoring the motion of a scan mirror employed for sweeping a light beam in electro-optical readers for reading indicia such as bar code symbols, or in image projectors for displaying images and, more particularly, to reducing crosstalk in a feedback signal indicative of such mirror motion.

2. Description of the Related Art

Electro-optical readers are well known in the art for electro-optically transforming a spatial pattern of graphic indicia, known as a symbol, into a time-varying electrical signal which is then decoded into data. Typically, a light beam generated from a light source is focused by a lens along an optical path toward a target that includes the symbol. The light beam is repetitively swept along a scan line or a series of scan lines arranged in a raster pattern over the symbol by moving a scan mirror located in the optical path. A photodetector detects light scattered or reflected from the symbol and generates an analog electrical signal. Electronic circuitry converts the analog signal into a digitized signal having pulse widths corresponding to physical widths of bars and spaces comprising the symbol, and a decoder decodes the digitized signal into data descriptive of the symbol.

The repetitive sweeping of the light beam is performed by a drive, typically a motor having a rotor oscillatable about an axis. A permanent magnet and the scan mirror are jointly oscillatable with the rotor. The motor is driven by a drive coil wound on a bobbin that is located physically close to the permanent magnet. A feedback coil is also wound on the same bobbin. In response to an alternating voltage drive signal applied to the drive coil, the electromagnetic field produced by the drive coil interacts with the permanent magnetic field of the magnet, thereby jointly moving the magnet and the mirror. The frequency of the drive signal in the drive coil is the same as the rotor motion, with one cycle of the drive signal corresponding to one cycle of rotor motion. The amplitude of the drive signal in the drive coil is proportional to the velocity of the rotor motion. The polarity of the drive signal in the drive coil is dependent on the direction of rotor motion such that a positive half cycle of the drive signal indicates that the rotor is moving in one drive direction, and a negative half cycle indicates that the rotor is moving in the opposite drive direction. Zero crossings of the drive signal occur when the rotor reaches its maximum travel at each end of a respective scan line. At each zero crossing, the rotor stops for an instant and reverses drive direction.

The feedback coil is useful for a variety of purposes. It generates an alternating voltage signal, known as a feedback signal, due to the movement of the magnet. The frequency and polarity of the feedback signal generated in the feedback coil corresponds to the frequency and polarity of the drive signal. An electrical drive monitoring circuit is often employed to monitor the amplitude of the feedback signal and, for example, turn the light source off if the amplitude falls below a predetermined threshold, thereby indicating that the drive is malfunctioning. An electrical closed loop control circuit is also often employed to process the feedback signal to make decisions about how to continue driving the motor. Still another electronic circuit that is often employed processes the zero crossings of the feedback signal to derive a start-of-scan (SOS) signal that represents rotor motion and is used to synchronize the scan lines.

Although generally satisfactory for its intended purpose, the use of the feedback coil for monitoring for drive failure, for driving the drive motor, and for generating the SOS signal causes problems. There is undesirable magnetic coupling or crosstalk between the drive and feedback coils. To remove such unwanted coupled signals and the resulting noise and distortion, electronics are usually added to actively cancel the coupled signals, and filtering is necessary to ensure control loop stability. Since filtering introduces phase delays, the SOS signal will never represent the true position of a beam spot of the scanning light beam relative to the leading bars and spaces in a target symbol. This problem is solved in the art by adding and adjusting electronics to advance or delay the SOS signal depending on the type of motor used. The art has also proposed the use of optical feedback circuits. In addition, when the feedback coil is coupled to the drive coil, an annoying buzzing sound is sometimes generated.

Another arrangement, other than a symbol reader, that repetitively scans a light beam in a raster pattern over a target is an image projector for projecting an image on a display surface, for example, a screen. Typically, one or more energizable lasers of different wavelengths project respective laser beams toward the screen, while an oscillating drive sweeps the beams in scan lines over the screen. Usually, a pair of scan mirrors is employed to sweep the beams in mutually orthogonal directions. The lasers are energized and deenergized during each sweep to create a bit-mapped image on the screen for viewing. As in the case of readers, at least one of these scan mirrors is oscillated by a drive which includes a motor having feedback and drive coils, as described above, with their attendant problems of cross-coupled signals, extra hardware, phase delays and annoying sounds. Crosstalk is a more severe problem in image projectors, because the motion or velocity of the scan mirror and, hence, of each scan line swept by the scan mirror must be very highly controlled to be a constant value for both right-to-left and left-to-right scan lines. Otherwise, the projected image will be degraded.

SUMMARY OF THE INVENTION

Objects of the Invention

Accordingly, it is a general object of this invention to reduce, if not eliminate, crosstalk from contaminating a feedback signal in light scanning arrangements, such as electro-optical readers and image projectors.

More particularly, it is an object of the present invention to monitor motion of a scan mirror to a high degree of accuracy.

Still another object of the present invention is to reliably enable drive failure to be monitored, to reliably ensure control loop stability, to reliably generate SOS signals without phase delays, and to reliably eliminate annoying sounds in such light scanning arrangements without the feedback signal being contaminated by crosstalk.

Features of the Invention

In keeping with the above objects and others which will become apparent hereinafter, one feature of the present invention resides, briefly stated, in an arrangement for, and a method of, monitoring motion of a scan mirror used for sweeping a light beam by generating a feedback signal indicative of such motion and uncontaminated by crosstalk.

The arrangement may be employed in an electro-optical reader in which case the light beam is swept as one or more scan lines across a symbol, preferably a one- or two-dimensional symbol. The arrangement could also be used in an image projector in which case the light beam is swept in a raster pattern of scan lines across a screen on which an image is viewable. In either case, the light beam is moved by an electrical motor having a rotor on which the scan mirror is mounted for oscillating movement. A permanent magnet having a permanent magnetic field is mounted on the mirror for joint movement therewith. A periodic drive signal is applied to a drive coil which generates an electromagnetic field that interacts with the permanent field to oscillate the magnet and the mirror in opposite drive directions to generate a raster pattern of scan lines which extend in mutually orthogonal scan directions over a target. In the case of the reader, a portion of the light derived from the scan lines and scattered by the symbol is processed to read the symbol. In the case of the projector, the light source is energized and deenergized during travel of the beam along each scan line to create the image on the target screen.

A primary feedback coil is wound in the motor in proximity with the magnet for generating a primary feedback signal indicative of joint motion of the mirror and the magnet. However, the primary feedback coil is in close proximity with the drive coil and is contaminated by crosstalk with the drive signal.

In accordance with this invention, a secondary feedback coil is wound in the motor further away from the magnet as compared to the primary coil. The secondary coil generates a secondary feedback signal weaker than the primary feedback signal, but also indicative of the joint motion of the mirror and the magnet. The secondary coil is also in proximity with the drive coil and is also contaminated by the crosstalk with the drive signal. The feedback signals are then processed to remove the crosstalk from the primary feedback signal. For example, the second feedback signal can be subtracted from the first feedback signal. The result is a feedback signal reduced of crosstalk and still indicative of the mirror motion.

By employing a secondary feedback coil, cancellation circuitry for cross-coupled signals is unnecessary. Accuracy of the feedback signal is improved. The feedback signal has no phase delays. Motor startup time no longer has to be delayed by consideration of transformer feedthrough to the primary feedback coil. There are no annoying sounds related to transformer coupling between coils.

In brief, the crosstalk-reduced feedback signal is an accurate representation of motor position and velocity and, hence, of beam position. The crosstalk-reduced feedback signal is not corrupted due to signal feedthrough between the drive and feedback coils. Performance of the image projector or the reader is enhanced.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a perspective view of a hand-held instrument projecting an image at a working distance therefrom;

FIG. 2 is an enlarged, overhead, perspective view of an image projection arrangement for installation in the instrument of FIG. 1;

FIG. 9 is a sectional view taken on line 9-9 of FIG. 8;

FIG. 10 is an electrical schematic of a detail of FIG. 8;

DETAILED DESCRIPTION OF THE PREFERRED EMBODIMENTS

Figure 3:
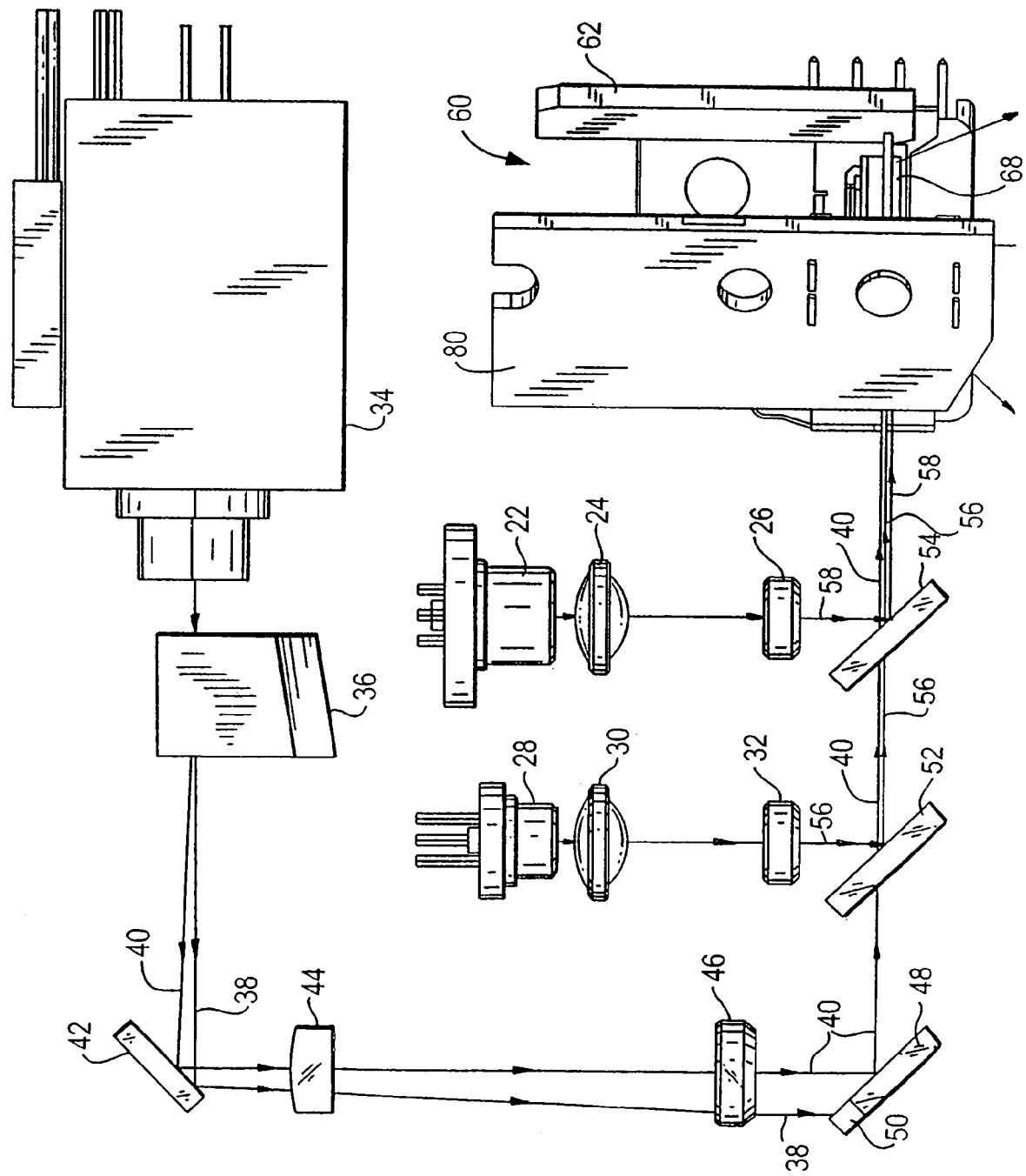
FIG. 3 is a top plan view of the arrangement of FIG. 2.

Reference numeral 10 in FIG. 1 generally identifies a hand-held instrument, for example, a personal digital assistant, in which a lightweight, compact, image projection arrangement 20, as shown in FIG. 2, is mounted and operative for projecting a two-dimensional color image at a variable distance from the instrument. By way of example, an image 18 is situated within a working range of distances relative to the instrument 10.

As shown in FIG. 1, the image 18 extends over an optical horizontal scan angle A extending along the horizontal direction, and over an optical vertical scan angle B extending along the vertical direction, of the image. As described below, the image is comprised of illuminated and non-illuminated pixels on a raster pattern of scan lines swept by a scanner in the arrangement 20.

The parallelepiped shape of the instrument 10 represents just one form factor of a housing in which the arrangement 20 may be implemented. The instrument can be shaped as a pen, a cellular telephone, a clamshell or a wristwatch. In the preferred embodiment, the arrangement 20 measures less than about 30 cubic centimeters in volume. This compact, miniature size allows the arrangement 20 to be mounted in housings of many diverse shapes, large or small, portable or stationary, including some having an on-board display 12, a keypad 14, and a window 16 through which the image is projected.

Referring to FIGS. 2 and 3, the arrangement 20 includes a semiconductor laser 22 which, when energized, emits a bright red laser beam at about 635-655 nanometers. Lens 24 is a biaspheric convex lens having a positive focal length and is operative for collecting virtually all the energy in the red beam and for producing a diffraction-limited beam. Lens 26 is a concave lens having a negative focal length. Lenses 24, 26 are held by non-illustrated respective lens holders apart on a support (not illustrated in FIG. 2 for clarity) inside the instrument 10. The lenses 24, 26 shape the red beam profile over the working distance.

Another semiconductor laser 28 is mounted on the support and, when energized, emits a diffraction-limited blue laser beam at about 475-505 nanometers. Another biaspheric convex lens 30 and a concave lens 32 are employed to shape the blue beam profile in a manner analogous to lenses 24, 26.

A green laser beam having a wavelength on the order of 530 nanometers is generated not by a semiconductor laser, but instead by a green module 34 having an infrared diode-pumped YAG crystal laser whose output beam is 1060 nanometers. A non-linear frequency doubling crystal is included in the infrared laser cavity between the two laser mirrors. Since the infrared laser power inside the cavity is much larger than the power coupled outside the cavity, the frequency doubler is more efficient generating the double frequency green light inside the cavity. The output mirror of the laser is reflective to the 1060 nm infrared radiation, and transmissive to the doubled 530 nm green laser beam. Since the correct operation of the solid-state laser and frequency doubler require precise temperature control, a semiconductor device relying on the Peltier effect is used to control the temperature of the green laser module. The thermo-electric cooler can either heat or cool the device depending on the polarity of the applied current. A thermistor is part of the green laser module in order to monitor its temperature. The readout from the thermistor is fed to the controller, which adjusts the control current to the thermo-electric cooler accordingly.

As explained below, the lasers are pulsed in operation at frequencies on the order of 100 MHz. The red and blue semiconductor lasers 22, 28 can be pulsed at such high frequencies, but the currently available green solid-state lasers cannot. As a result, the green laser beam exiting the green module 34 is pulsed with an acousto-optical modulator (AOM) 36 which creates an acoustic standing wave inside a crystal for diffracting the green beam. The AOM 36, however, produces a zero-order, non-diffracted beam 38 and a first-order, pulsed, diffracted beam 40. The beams 38, 40 diverge from each other and, in order to separate them to eliminate the undesirable zero-order beam 38, the beams 38, 40 are routed along a long, folded path having a folding mirror 42. Alternatively, the AOM can be used either externally or internally to the green laser module to pulse the green laser beam. Other possible ways to modulate the green laser beam include electro-absorption modulation, or Mach-Zender interferometer. The AOM is shown schematically in FIG. 2.

The beams 38, 40 are routed through positive and negative lenses 44, 46. However, only the diffracted green beam 40 is allowed to impinge upon, and reflect from, the folding mirror 48. The non-diffracted beam 38 is absorbed by an absorber 50, preferably mounted on the mirror 48.

The arrangement includes a pair of dichroic filters 52, 54 arranged to make the green, blue and red beams as co-linear as possible before reaching a scanning assembly 60. Filter 52 allows the green beam 40 to pass therethrough, but the blue beam 56 from the blue laser 28 is reflected by the interference effect. Filter 54 allows the green and blue beams 40, 56 to pass therethrough, but the red beam 58 from the red laser 22 is reflected by the interference effect.

Figure 4:
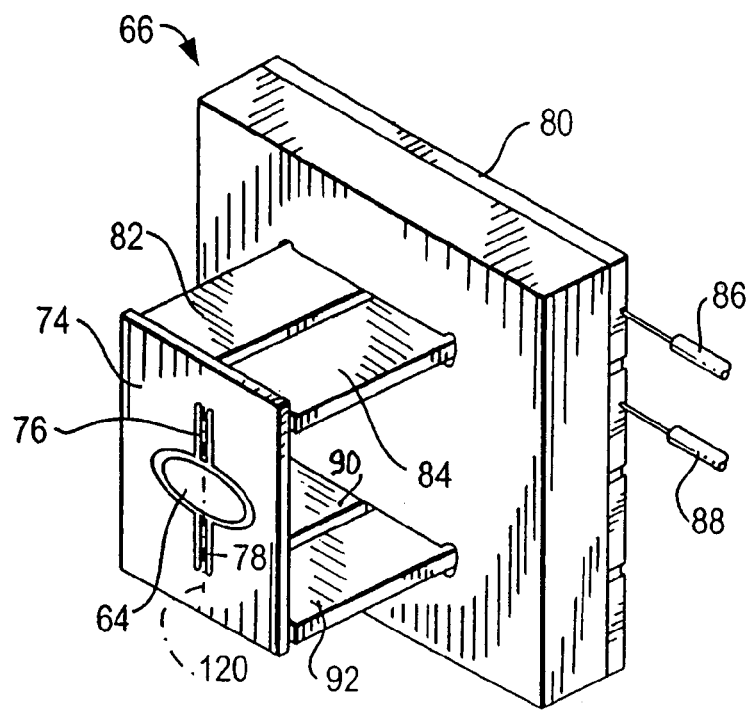
FIG. 4 is a perspective front view of an inertial drive for use in the arrangement of FIG. 2.
Figure 5:
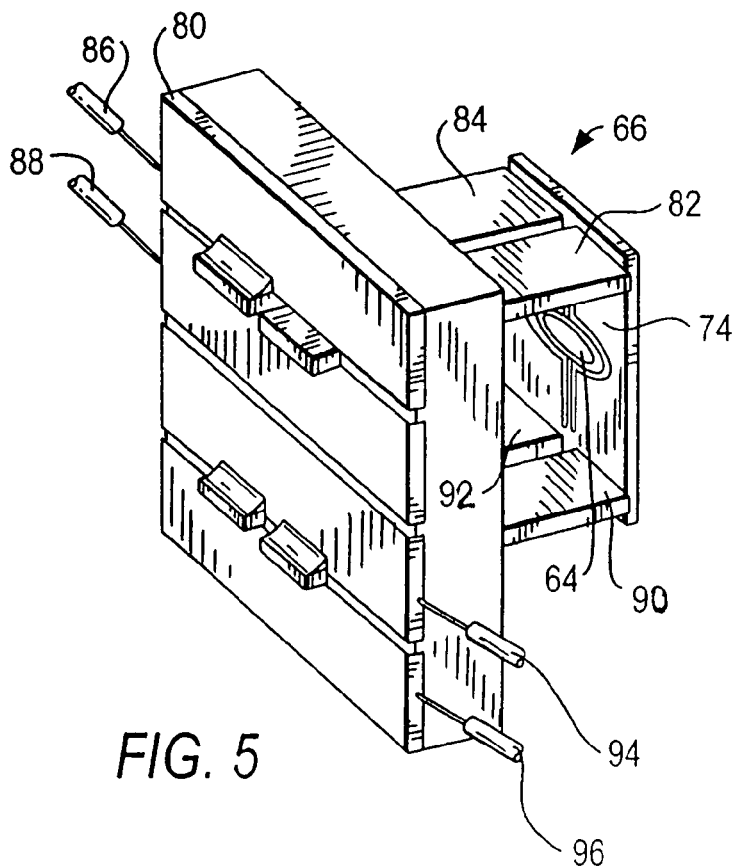
FIG. 5 is a perspective rear view of the inertial drive of FIG. 4.

The nearly co-linear beams 40, 56, 58 are directed to, and reflected off, a stationary bounce mirror 62. The scanning assembly 60 includes a first scan mirror 64 oscillatable by an inertial drive 66 (shown in isolation in FIGS. 4-5) at a first scan rate to sweep the laser beams reflected off the bounce mirror 62 over the first horizontal scan angle A, and a second scan mirror 68 oscillatable by an electromagnetic drive 70 at a second scan rate to sweep the laser beams reflected off the first scan mirror 64 over the second vertical scan angle B. In a variant construction, the scan mirrors 64, 68 can be replaced by a single two-axis mirror.

The inertial drive 66 is a high-speed, low electrical power-consuming component. Details of the inertial drive can be found in U.S. patent application Ser. No. 10/387,878, filed Mar. 13, 2003, assigned to the same assignee as the instant application, and incorporated herein by reference thereto. The use of the inertial drive reduces power consumption of the scanning assembly 60 to less than one watt and, in the case of projecting a color image, as described below, to less than ten watts.

The drive 66 includes a movable frame 74 for supporting the scan mirror 64 by means of a hinge that includes a pair of co-linear hinge portions 76, 78 extending along a hinge axis and connected between opposite regions of the scan mirror 64 and opposite regions of the frame. The frame 74 need not surround the scan mirror 64, as shown.

The frame, hinge portions and scan mirror are fabricated of a one-piece, generally planar, silicon substrate which is approximately 150μ thick. The silicon is etched to form omega-shaped slots having upper parallel slot sections, lower parallel slot sections, and U-shaped central slot sections. The scan mirror 64 preferably has an oval shape and is free to move in the slot sections. In the preferred embodiment, the dimensions along the axes of the oval-shaped scan mirror measure 749μ×1600μ. Each hinge portion measure 27μ in width and 1130μ in length. The frame has a rectangular shape measuring 3100μ in width and 4600μ in length.

The inertial drive is mounted on a generally planar, printed circuit board 80 and is operative for directly moving the frame and, by inertia, for indirectly oscillating the scan mirror 64 about the hinge axis. One embodiment of the inertial drive includes a pair of piezoelectric transducers 82, 84 extending perpendicularly of the board 80 and into contact with spaced apart portions of the frame 74 at either side of hinge portion 76. An adhesive may be used to insure a permanent contact between one end of each transducer and each frame portion. The opposite end of each transducer projects out of the rear of the board 80 and is electrically connected by wires 86, 88 to a periodic alternating voltage source (not shown).

In use, the periodic signal applies a periodic drive voltage to each transducer and causes the respective transducer to alternatingly extend and contract in length. When transducer 82 extends, transducer 84 contracts, and vice versa, thereby simultaneously pushing and pulling the spaced apart frame portions and causing the frame to twist about the hinge axis. The drive voltage has a frequency corresponding to the resonant frequency of the scan mirror. The scan mirror is moved from its initial rest position until it also oscillates about the hinge axis at the resonant frequency. In a preferred embodiment, the frame and the scan mirror are about 150μ thick, and the scan mirror has a high Q factor. A movement on the order of 1 μ by each transducer can cause oscillation of the scan mirror at scan rates in excess of 20 kHz.

Another pair of piezoelectric transducers 90, 92 extends perpendicularly of the board 80 and into permanent contact with spaced apart portions of the frame 74 at either side of hinge portion 78. Transducers 90, 92 serve as feedback devices to monitor the oscillating movement of the frame and to generate and conduct electrical feedback signals along wires 94, 96 to a feedback control circuit (not shown).

Alternately, instead of using piezo-electric transducers 90, 92 for feedback, magnetic feedback can be used, where a magnet is mounted on the back of the high-speed mirror, and an external coil is used to pickup the changing magnetic field generated by the oscillating magnet.

Although light can reflect off an outer surface of the scan mirror, it is desirable to coat the surface of the mirror 64 with a specular coating made of gold, silver, aluminum, or a specially designed highly reflective dielectric coating.

Figure 8:
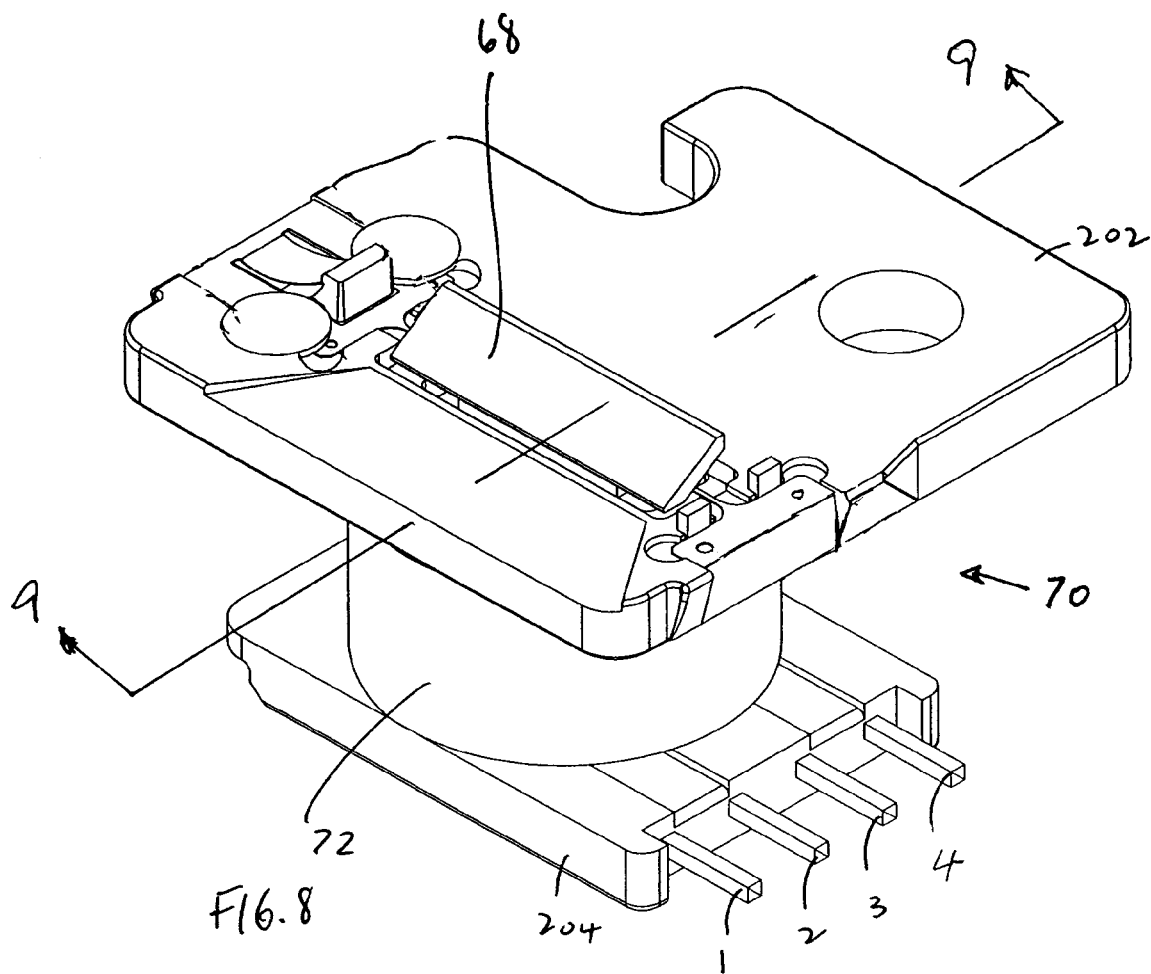
FIG. 8 is a perspective, enlarged view of a detail of the arrangement of FIG. 6.

The electromagnetic drive 70, shown in isolation in FIG. 8, includes a permanent magnet 200 (see FIG. 9) jointly mounted on and behind the second scan mirror 68, and an electromagnetic drive coil 72 operative for generating a periodic magnetic field in response to receiving a periodic drive signal. The drive coil 72 is adjacent the magnet 200 so that the periodic field magnetically interacts with the permanent field of the magnet and causes the magnet and, in turn, the second scan mirror 68 to oscillate.

The inertial drive 66 oscillates the scan mirror 64 at a high speed at a scan rate preferably greater than 5 kHz and, more particularly, on the order of 18 kHz or more. This high scan rate is at an inaudible frequency, thereby minimizing noise and vibration. The electromagnetic drive 70 oscillates the scan mirror 68 at a slower scan rate on the order of 40 Hz which is fast enough to allow the image to persist on a human eye retina without excessive flicker.

The faster mirror 64 sweeps a horizontal scan line, and the slower mirror 68 sweeps the horizontal scan line vertically, thereby creating a raster pattern which is a grid or sequence of roughly parallel scan lines from which the image is constructed. Each scan line has a number of pixels. The image resolution is preferably XGA quality of 1024×768 pixels. Over a limited working range we can display high-definition television standard, denoted 720p, 1270×720 pixels. In some applications, a one-half VGA quality of 320×480 pixels, or one-fourth VGA quality of 320×240 pixels, is sufficient. At minimum, a resolution of 160×160 pixels is desired.

The roles of the mirrors 64, 68 could be reversed so that mirror 68 is the faster, and mirror 64 is the slower. Mirror 64 can also be designed to sweep the vertical scan line, in which event, mirror 68 would sweep the horizontal scan line. Also, the inertial drive can be used to drive the mirror 68. Indeed, either mirror can be driven by an electromechanical, electrical, mechanical, electrostatic, magnetic, or electromagnetic drive.

The slow-mirror is operated in a constant velocity sweep-mode during which time the image is displayed. During the mirror's return, the mirror is swept back into the initial position at its natural frequency, which is significantly higher. During the mirror's return trip, the lasers can be powered down in order to reduce the power consumption of the device.

Figure 6:
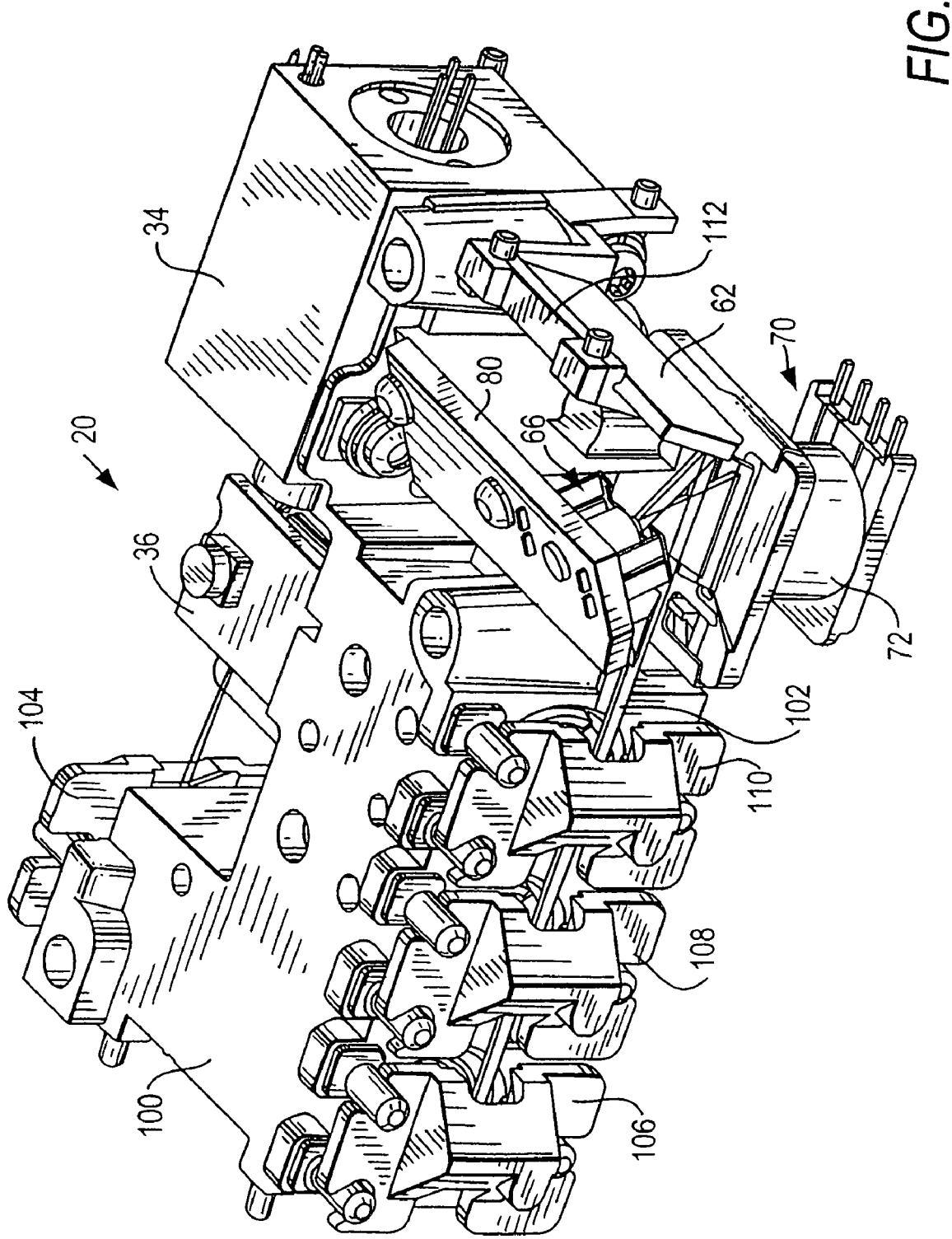
FIG. 6 is a perspective view of a practical implementation of the arrangement of FIG. 2.

FIG. 6 is a practical implementation of the arrangement 20 in the same perspective as that of FIG. 2. The aforementioned components are mounted on a support which includes a top cover 100 and a support plate 102. Holders 104, 106, 108, 110, 112 respectively hold folding mirrors 42, 48, filters 52, 54 and bounce mirror 62 in mutual alignment. Each holder has a plurality of positioning slots for receiving positioning posts stationarily mounted on the support. Thus, the mirrors and filters are correctly positioned. As shown, there are three posts, thereby permitting two angular adjustments and one lateral adjustment. Each holder can be glued in its final position.

The image is constructed by selective illumination of the pixels in one or more of the scan lines. As described below in greater detail with reference to FIG. 7, a controller 114 causes selected pixels in the raster pattern to be illuminated, and rendered visible, by the three laser beams. For example, red, blue and green power controllers 116, 118, 120 respectively conduct electrical currents to the red, blue and green lasers 22, 28, 34 to energize the latter to emit respective light beams at each selected pixel, and do not conduct electrical currents to the red, blue and green lasers to deenergize the latter to non-illuminate the other non-selected pixels. The resulting pattern of illuminated and non-illuminated pixels comprise the image, which can be any display of human- or machine-readable information or graphic.

Referring to FIG. 1, the raster pattern is shown in an enlarged view. Starting at an end point, the laser beams are swept by the inertial drive along the horizontal direction at the horizontal scan rate to an opposite end point to form a scan line. Thereupon, the laser beams are swept by the electromagnetic drive 70 along the vertical direction at the vertical scan rate to another end point to form a second scan line. The formation of successive scan lines proceeds in the same manner.

The image is created in the raster pattern by energizing or pulsing the lasers on and off at selected times under control of the microprocessor 114 or control circuit by operation of the power controllers 116, 118, 120. The lasers produce visible light and are turned on only when a pixel in the desired image is desired to be seen. The color of each pixel is determined by one or more of the colors of the beams. Any color in the visible light spectrum can be formed by the selective superimposition of one or more of the red, blue, and green lasers. The raster pattern is a grid made of multiple pixels on each line, and of multiple lines. The image is a bit-map of selected pixels. Every letter or number, any graphical design or logo, and even machine-readable bar code symbols, can be formed as a bit-mapped image.

Figure 7:
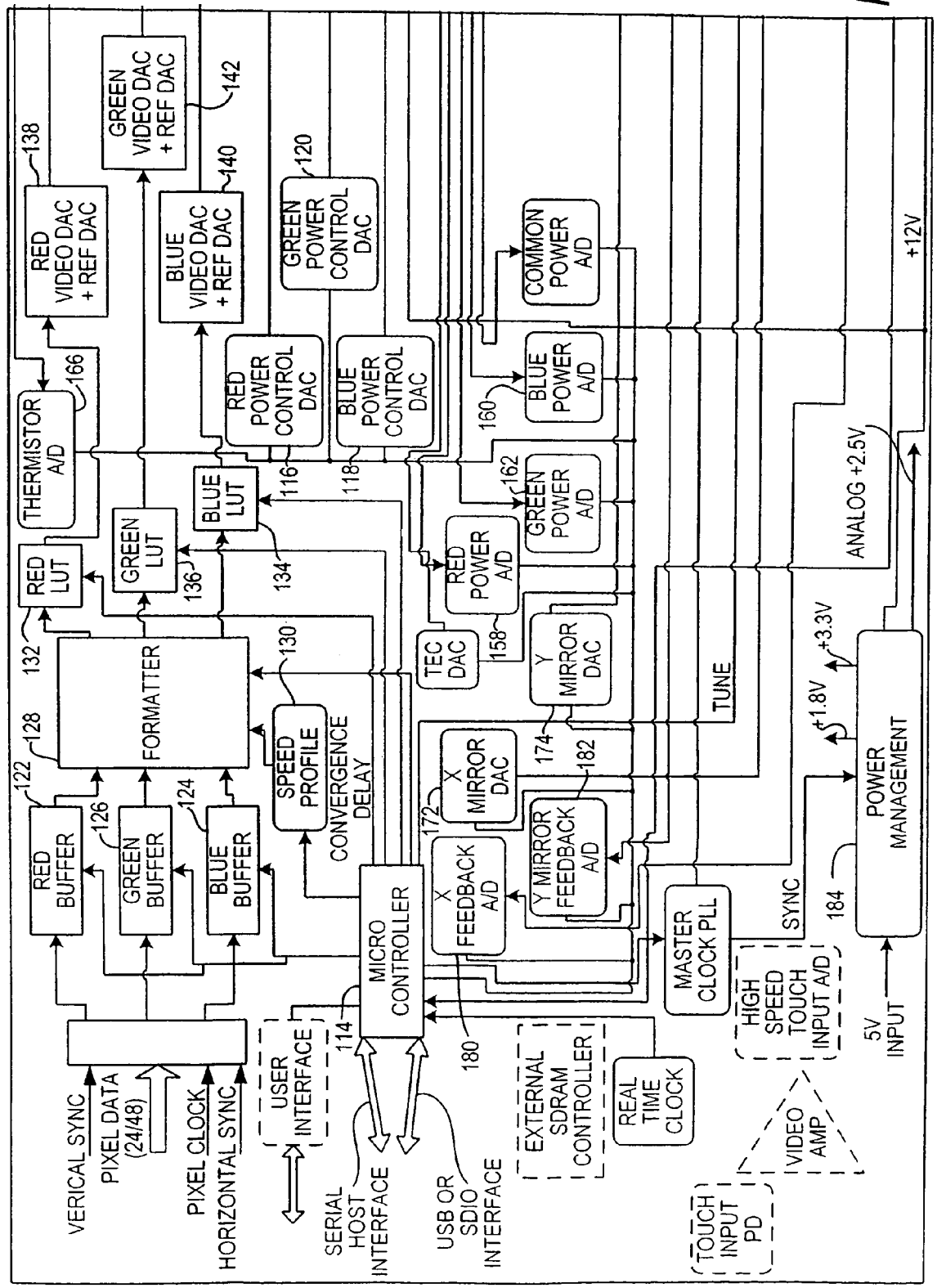
FIG. 7 is an electrical schematic block diagram depicting operation of the arrangement of FIG. 2.

As shown in FIG. 7, an incoming video signal having vertical and horizontal synchronization data, as well as pixel and clock data, is sent to red, blue and green buffers 122, 124, 126 under control of the microprocessor 114. The storage of one full VGA frame requires many kilobytes, and it would be desirable to have enough memory in the buffers for two full frames to enable one frame to be written, while another frame is being processed and projected. The buffered data is sent to a formatter 128 under control of a speed profiler 130 and to red, blue and green look up tables (LUTs) 132, 134, 136 to correct inherent internal distortions caused by scanning, as well as geometrical distortions caused by the angle of the display of the projected image. The resulting red, blue and green digital signals are converted to red, blue and green analog signals by digital to analog converters (DACs) 138, 140, 142. The red and blue analog signals are fed to red and blue laser drivers (LDs) 144, 146 which are also connected to the red and blue power controllers 116, 118. The green analog signal is fed to the AOM radio frequency (RF) driver 150 and, in turn, to the green laser 34 which is also connected to a green LD 148 and to the green power controller 120.

Feedback controls are also shown in FIG. 7, including red, blue and green photodiode amplifiers 152, 154, 156 connected to red, blue and green analog-to-digital (A/D) converters 158, 160, 162 and, in turn, to the microprocessor 114. Heat is monitored by a thermistor amplifier 164 connected to an A/D converter 166 and, in turn, to the microprocessor.

The scan mirrors 64, 68 are driven by drivers 168, 170 which are fed analog drive signals from DACs 172, 174 which are, in turn, connected to the microprocessor. Feedback amplifiers 176, 178 detect the position of the scan mirrors 64, 68, and are connected to feedback A/Ds 180, 182 and, in turn, to the microprocessor.

A power management circuit 184 is operative to minimize power while allowing fast on-times, preferably by keeping the green laser on all the time, and by keeping the current of the red and blue lasers just below the lasing threshold.

A laser safety shut down circuit 186 is operative to shut the lasers off if either of the scan mirrors 64, 68 is detected as being out of position.

Referring again to FIGS. 8-9, the electromagnetic drive 70 for oscillating the permanent magnet 200 and the scan mirror 68 includes an upper support 202, a lower support 204, and a bobbin 206 around which the drive coil 72 is wound. When the drive coil 72 is energized by a periodic drive signal, the drive coil generates an alternating magnetic field that interacts with the permanent magnetic field of the magnet, thereby causing the magnet 200 and the mirror 68 to oscillate. The upper support 202 has a recess 208 to bring the magnet in close proximity to the drive coil.

As previously noted, just as it is desired to monitor the position and motion of the scan mirror 64, it is also desired to monitor the position and motion of the scan mirror 68. To this end, a primary feedback coil 210 is wound around the bobbin 206 in close proximity with the magnet 200 to generate a primary feedback signal indicative of the joint motion of the magnet 200 and the mirror 68. However, the primary feedback coil 210 is also in close proximity with the drive coil 72. There is undesired magnetic coupling, also called transformer feed-through or crosstalk, between the drive coil and the primary feedback coil, which contaminates the primary feedback signal.

To reduce, if not eliminate, such crosstalk, a secondary feedback coil 212 is wound around the bobbin 206 and is positioned further away from the magnet 200 as compared to the primary feedback coil 210. As shown in FIG. 9, the secondary coil 212 is positioned axially further away from the magnet than the primary coil 210. The secondary coil 212 generates a secondary feedback signal weaker than the primary feedback signal due to its more remote position. The secondary coil is also positioned in close proximity with the drive coil 72 and is contaminated by the same crosstalk from the drive coil.

In accordance with this invention, the primary and secondary feedback signals are processed to remove the crosstalk from the primary feedback signal and thereby produce a crosstalk-reduced feedback signal which is accurately indicative of the motion of the scan mirror 68. This crosstalk-reduced signal is conducted to the feedback amplifier 178, and converted to a digital signal in the feedback A/D 182, and conducted to the microcontroller 114. Such processing includes subtracting the secondary feedback signal from the primary feedback signal, thereby canceling the crosstalk which is the same on both feedback signals. Such subtraction can be performed by feeding both feedback signals through a comparator, or by electronic inversion, or, preferably, as shown in FIG. 10, in which the primary feedback coil 210 is wound in one circumferential direction, for example, clockwise, and the secondary feedback coil 212 is wound in an opposite circumferential direction, for example, counter-clockwise, and then by electrically connecting the feedback coils 210, 212 in series. The crosstalk-reduced feedback signal appears across output terminals 1, 4. The periodic drive signal for the drive coil 72 is applied across input terminals 2, 3.

The use of two feedback coils not only can eliminate electrical noise, but can also reduce other forms of noise. For example, if the scan mirror 68 is subjected to an external shock or vibration, these forces are transmitted to the magnet, which are then sensed by both feedback coils.

Figure 11:
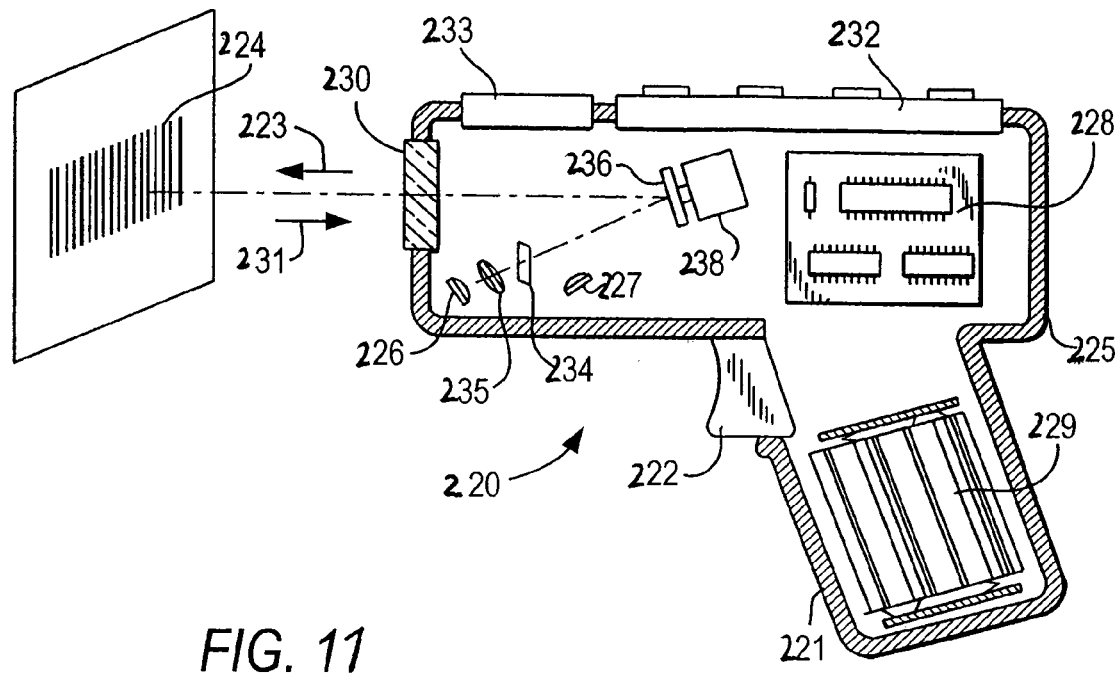
FIG. 11 is a diagrammatic view of a hand-held instrument for reading indicia.

This invention, as noted above, is not intended to be limited solely to monitoring the motion of a scan mirror in an image projection arrangement, but can also be employed in an electro-optical reader 220 of the type depicted in FIG. 11 for electro-optically reading indicia, such as bar code symbol 224, located in a range of working distances therefrom. The reader 220 has a pistol grip handle 221 and a manually actuatable trigger 222 which, when depressed, enables a light beam 223 to be directed at the symbol 224. The reader 220 includes a housing 225 in which a light source 226, a light detector 227, signal processing circuitry 228, and a battery pack 229 are accommodated. A light-transmissive window 230 at a front of the housing enables the light beam 223 to exit the housing, and allows light 231 scattered off the symbol to enter the housing. A keyboard 232 and a display 233 may advantageously be provided on a top wall of the housing for ready access thereto.

In use, an operator holding the handle 221 aims the housing at the symbol and depresses the trigger. The light source 226 emits a light beam which is optically modified and focused by an optical focusing assembly 235 to form a beam spot on the symbol 224. The beam passes through a beam splitter 234 to a scan mirror 236 which is repetitively oscillated at a scan rate of at least 20 scans a second by a motor drive 238. The scan mirror 236 reflects the beam incident thereon to the symbol 224 and sweeps the beam spot in scans across the symbol in a scan pattern. The scan pattern can be a scan line extending lengthwise along the symbol along a scan direction, or a series of scan lines arranged along mutually orthogonal directions, or an omnidirectional pattern, just to name a few possibilities.

The reflected light 231 has a variable intensity over the scan pattern and passes through the window 230 onto the scan mirror 236 where it is reflected onto the splitter 234 and, in turn, reflected to the photodetector 227 for conversion to an analog electrical signal. The signal processing circuitry 228 digitizes and decodes the signal to extract the data encoded in the symbol.

Figure 12:
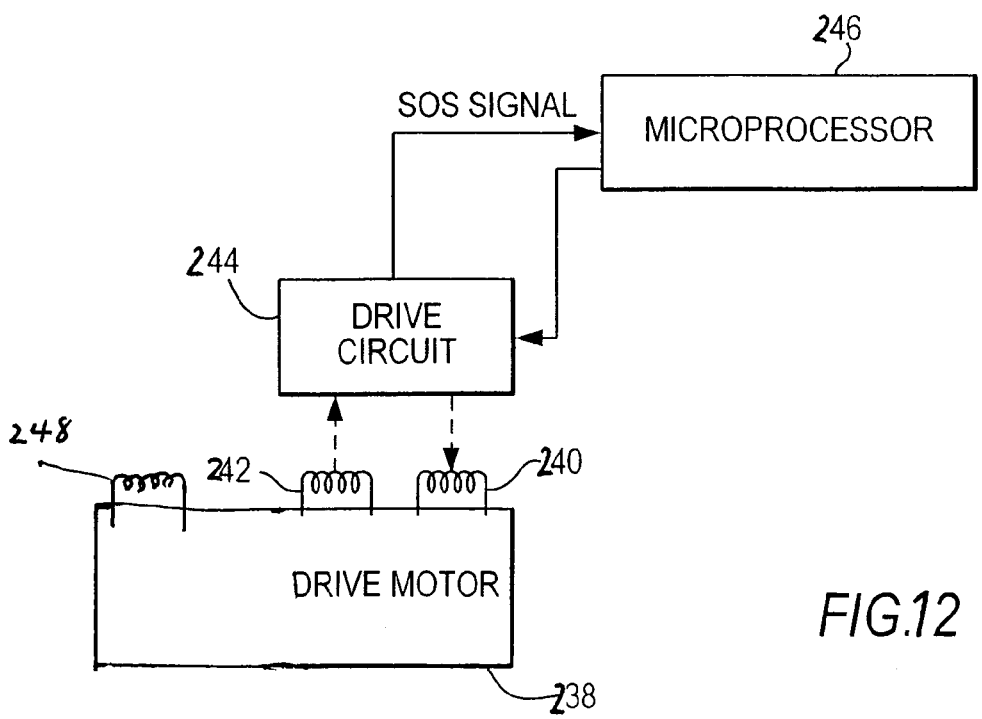
FIG. 12 is a block diagram depicting usage of the invention in the instrument of FIG. 11.

The drive motor 238 is shown in more detail in FIG. 12 with a drive coil 240 and a primary feedback coil 242 both wound on a common bobbin. The signal processing circuitry 228 includes a control microprocessor 246 operative for sending a control signal to a drive circuit 244 which, in turn, sends a drive signal to the drive coil 240 to generate an electromagnetic field that interacts with a permanent magnet (not illustrated) and drives the motor 238.

As explained above, the primary feedback coil 242 also interacts with the magnet and generates an electrical feedback signal of the same frequency as the drive signal and is useful for a variety of purposes. For example, the drive circuit 244 includes an error comparator in a closed loop circuit for adjusting the amplitude of the drive signal fed to the drive coil. Also, the feedback signal is used to derive the SOS signal described above, which is fed to the microprocessor for synchronization of the scan lines. In addition, the feedback signal is used to monitor for drive failure.

In accordance with one feature of this invention, it is proposed to position a secondary feedback coil 248 on the motor 238. As explained above, both feedback coils 242, 248 are contaminated to the same extent by electromagnetic coupling with the drive coil 240. By subtracting the feedback signals respectively generated by the feedback coils 242, 248, the crosstalk is removed.

It will be understood that each of the elements described above, or two or more together, also may find a useful application in other types of constructions differing from the types described above.

While the invention has been illustrated and described as embodied in an arrangement for and a method of monitoring scan mirror motion, especially for use in a color image projection arrangement, and in an electro-optical reader, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. An arrangement for monitoring motion of a scan mirror, comprising:
    a) a drive, including a permanent magnet having a permanent magnetic field and mounted on the mirror for joint movement therewith, and an energizable drive coil which, when energized by a periodic drive signal, generates an electromagnetic field that interacts with the permanent field of the magnet to jointly move the mirror and the magnet;
    b) a primary feedback coil in proximity with the magnet for generating a primary feedback signal indicative of joint motion of the mirror and the magnet, the primary feedback coil also being in proximity with the drive coil and being contaminated by crosstalk with the drive signal;
    c) a secondary feedback coil positioned further away from the magnet as compared to the primary feedback coil, and operative for generating a secondary feedback signal weaker than the primary feedback signal and also indicative of joint motion of the mirror and the magnet, the secondary feedback coil also being in proximity with the drive coil and also being contaminated by the crosstalk with the drive signal; and
    d) means for processing the feedback signals to remove the crosstalk from the primary feedback signal to thereby produce a crosstalk-reduced feedback signal indicative of the motion of the scan mirror.

2. The arrangement of claim 1, wherein the drive includes a bobbin around which the drive coil and the feedback coils are wound.

3. The arrangement of claim 1, wherein the processing means includes subtracting the second feedback signal from the first feedback signal.

4. The arrangement of claim 1, wherein the processing means includes the primary feedback coil being wound in one circumferential direction, and the secondary feedback coil being wound in an opposite circumferential direction, and means for electrically connecting the primary and secondary feedback coils in series.

5. The arrangement of claim 1, and a laser for directing a laser beam to the scan mirror for reflection therefrom to sweep the beam during the motion of the scan mirror.

6. A method of monitoring motion of a scan mirror, comprising the steps of:
    a) mounting a permanent magnet having a permanent magnetic field on the mirror for joint movement therewith;
    b) energizing a drive coil by a periodic drive signal, and generating an electromagnetic field that interacts with the permanent field of the magnet to jointly move the mirror and the magnet;
    c) mounting a primary feedback coil in proximity with the magnet for generating a primary feedback signal indicative of joint motion of the mirror and the magnet, the primary feedback coil also being in proximity with the drive coil and being contaminated by crosstalk with the drive signal;
    d) positioning a secondary feedback coil further away from the magnet as compared to the primary feedback coil, and generating a secondary feedback signal weaker than the primary feedback signal and also indicative of joint motion of the mirror and the magnet, the secondary feedback coil also being in proximity with the drive coil and also being contaminated by the crosstalk with the drive signal; and
    e) processing the feedback signals to remove the crosstalk from the primary feedback signal to thereby produce a crosstalk-reduced feedback signal indicative of the motion of the scan mirror.

7. The method of claim 6, and winding the drive coil and the feedback coils on a bobbin.

8. The method of claim 6, wherein the processing step is performed by subtracting the second feedback signal from the first feedback signal.

9. The method of claim 6, wherein the processing step is performed by electrically connecting the primary and secondary feedback coils in series, and by winding the primary and secondary feedback coils in opposite circumferential directions.

10. The method of claim 6, and directing a laser beam to the scan mirror for reflection therefrom to sweep the beam during the motion of the scan mirror.

* * * * *